United States Patent [19]

Hanks

[11] 4,207,867
[45] Jun. 17, 1980

[54] SOLAR ENERGY COLLECTOR AND METHOD

[76] Inventor: Lincoln Hanks, 3949 Adonis Dr., Salt Lake City, Utah 84117

[21] Appl. No.: 811,115

[22] Filed: Jun. 29, 1977

[51] Int. Cl.² ............................................... F24J 3/02
[52] U.S. Cl. .................................... 126/447; 126/449
[58] Field of Search ................. 126/270, 271, 447, 448

[56] References Cited

U.S. PATENT DOCUMENTS

| | | | |
|---|---|---|---|
| 2,202,756 | 5/1946 | Cline | 126/271 |
| 3,929,122 | 12/1975 | Alkasab | 126/271 |
| 4,007,728 | 2/1977 | Guba | 126/271 |
| 4,026,268 | 5/1977 | Bartos et al. | 126/271 |
| 4,043,317 | 8/1977 | Scharfman | 126/271 |
| 4,052,974 | 10/1977 | Vataru | 126/270 |
| 4,059,094 | 11/1977 | de Mendoza | 126/271 |
| 4,066,063 | 1/1978 | Gross et al. | 126/271 |

*Primary Examiner*—Carroll B. Dority, Jr.
*Attorney, Agent, or Firm*—H. Ross Workman; J. Winslow Young

[57] ABSTRACT

A solar energy collector and method including an insulated, box-like enclosure having a transparent wall on one side thereof for the transmittance of solar energy into the enclosure. An energy absorption plate is placed in spaced relationship in the enclosure where it will be exposed to incident solar radiation passing through the transparent wall. An insulated divider behind the solar energy absorption plate separates the remainder of the enclosure into a heat chamber adjacent the solar energy absorption plate and a return air chamber. Air duct means and a plurality of water conduits are mounted in heat exchange relationship on the solar energy absorption plate to provide means for collecting the absorbed heat. The surfaces of the ducts, conduits, and solar energy absorption plate are selectively coated with a heat-absorbing black for improved solar energy absorption and conversion to heat. The appropriate surfaces of the transparent wall are coated with an infrared reflective surface to reduce radiation heat losses from the solar energy collector.

11 Claims, 5 Drawing Figures

SOLAR ENERGY COLLECTOR AND METHOD

BACKGROUND

1. Field of the Invention

This invention relates to solar energy collector systems and, more particularly, to a solar energy collector panel wherein air and water systems are mounted in heat exchange relationship with a solar energy absorption plate inside the solar energy collector panel.

2. The Prior Art

Recent increases in the cost of energy for heating have resulted in an increased interest in the collection and utilization of solar energy. Various devices have been developed for the purpose of collecting and utilizing solar energy for heating and the like. For instance, persons have been known to place large, flat coils of black plastic tubing on a roof or other suitable location exposed to solar radiation. The black plastic tubing absorbs solar energy as heat and water is directed through the plastic tubing to absorb the heat. The heated water is used for heating purposes and also for hot water.

In other developments, homes and small office buildings have been erected with a large water reservoir formed as part of a wall exposed to solar radiation. The incident solar radiation is absorbed as thermal energy by the water in the wall reservoir. The thermal energy is stored in the water and subsequently emitted into the structure for heating purposes as required. Additionally, specially designed structures have been proposed such as shown in U.S. Pat. No. 3,949,732 for the purpose of utilizing incident solar energy.

However, until the present invention, it is believed that no apparatus and method has been provided which is inexpensive to fabricate, readily adapted for placement in conjunction with an existing dwelling, and which maximizes the absorption of solar energy as usable heat energy. It would, therefore, be a significant advancement in the art to provide a solar energy collector panel and method which is (1) inexpensive to fabricate, (2) readily adaptable to be used in conjunction with an existing structure, (3) easily assembled into a larger solar collector apparatus from a plurality of modular units, (4) maximizes the absorption of solar energy impinging on the collector panel, and (5) heats both air and water simultaneously. Such an invention is disclosed and claimed herein.

BRIEF SUMMARY AND OBJECTS OF THE INVENTION

The present invention relates to a solar energy collector and method wherein a solar energy absorption plate is enclosed in an insulated enclosure of a solar energy collector panel and exposed to incident solar radiation through a transparent wall of the enclosure. The solar energy collector includes distribution means for directing air and water in heat exchange relationship with the solar energy absorption plate. The air and water distribution means of each solar energy collector panel readily accommodates interconnection with other air and water distribution means of a plurality of solar energy collector panels to thereby form a solar energy collection system. Convective and conductive heat losses from the enclosure are reduced by suitably insulating the walls of the enclosure and by double panes of glass in the transparent wall. Radiation heat losses are lowered by coating the inside surfaces of the glass panes with an infrared reflective surface.

It is, therefore, a primary object of this invention to provide improvements in solar energy collectors.

Another object of this invention is to provide improvements in the method of absorbing solar radiation.

Another object of this invention is to provide a novel solar energy collector panel wherein the thermal energy is absorbed by both air and water.

Another object of this invention is to provide a solar energy collector which is inexpensive to fabricate and is readily adapted to be placed in use with an existing structure.

Another object of this invention is to provide a solar energy collector panel which is readily adapted to be joined with other solar energy collectors as modular units to provide a solar energy collector system.

These and other objects and features of the present invention will become more fully apparent from the following description and appended claims taken in conjunction with the accompanying drawing.

DETAILED DESCRIPTION OF THE PREFERRED EMBODIMENTS

Figure 1:
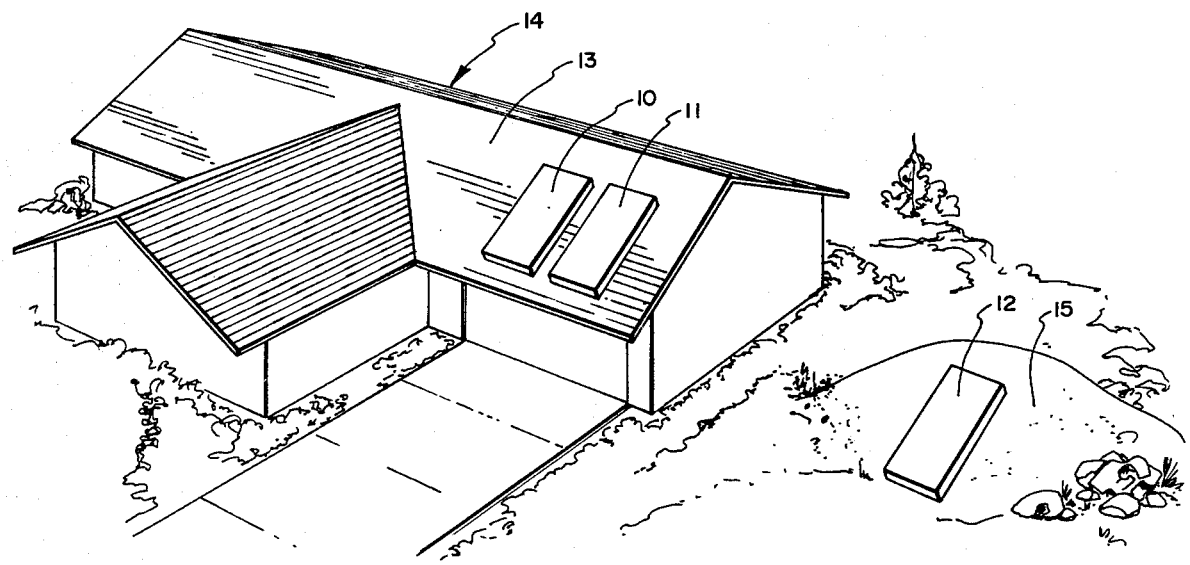
FIG. 1 is a perspective view of a plurality of solar energy collector panels shown in the environment of a dwelling.

The invention is best understood by reference to the drawing wherein like parts are designated with like numerals throughout.

Referring now more particularly to FIG. 1, a plurality of solar energy collector panels of this invention are shown herein as solar energy collector panels 10–12 in association with a dwelling 14. In particular, solar energy collector panels 10 and 11 are shown as mounted on roof 13 of dwelling 14 in a position wherein they will receive maximum exposure to incident solar radiation. Solar energy collector panel 12 is shown separated from dwelling 14 by being placed on a hillock 15. Solar energy collector panel 12 is mounted at an angular orientation corresponding to the angular orientation of solar collector panels 10 and 11 on roof 13 to achieve comparable exposure to the solar radiation.

As will be discussed more fully hereinafter, each of solar energy collector panels 10–12 is configurated to absorb maximum incident solar radiation as heat energy and to utilize this heat energy for heating air and water. The heated air and water may be utilized directly in dwelling 14 or directed to a suitable storage system (not shown). A hot water storage system may consist of, for example, an insulated tank (not shown) inside dwelling 14 or it may be buried under hillock 15 for concealment and additional insulation. Thermal energy from the heated air may be used in dwelling 14 and/or stored in an insulated rock pit (not shown) also buried, for example, under hillock 15. The heated air is directed among rocks in the rock pit and the rocks are heated to store the heat energy. Heated air may be obtained subsequently for conventional heating purposes. The rock pit (not shown), therefore, functions similarly to a conventional pebble bed heater or checker system preheater.

Figure 2:
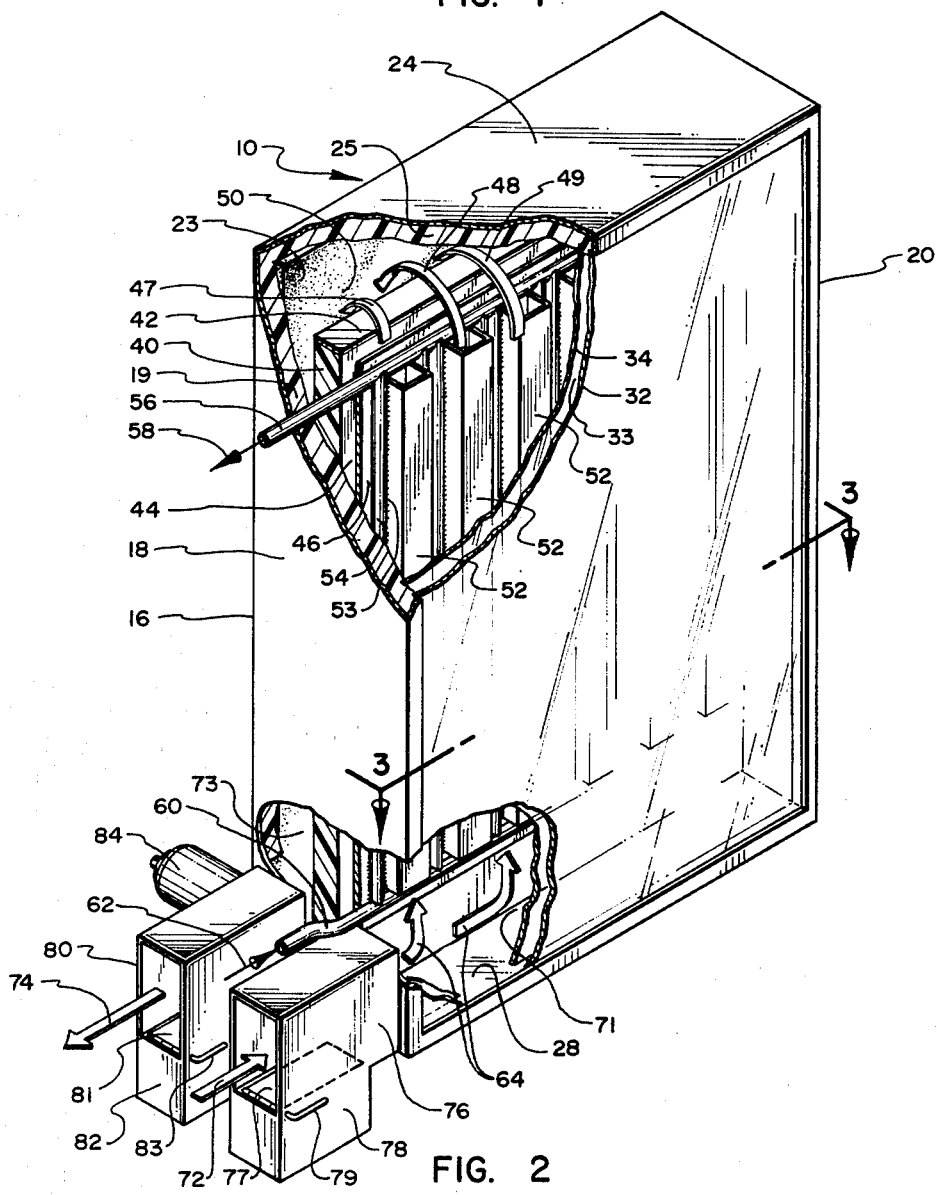
FIG. 2 is a perspective view of one presently preferred solar energy collector panel of this invention with portions broken away to reveal internal components.
Figure 3:
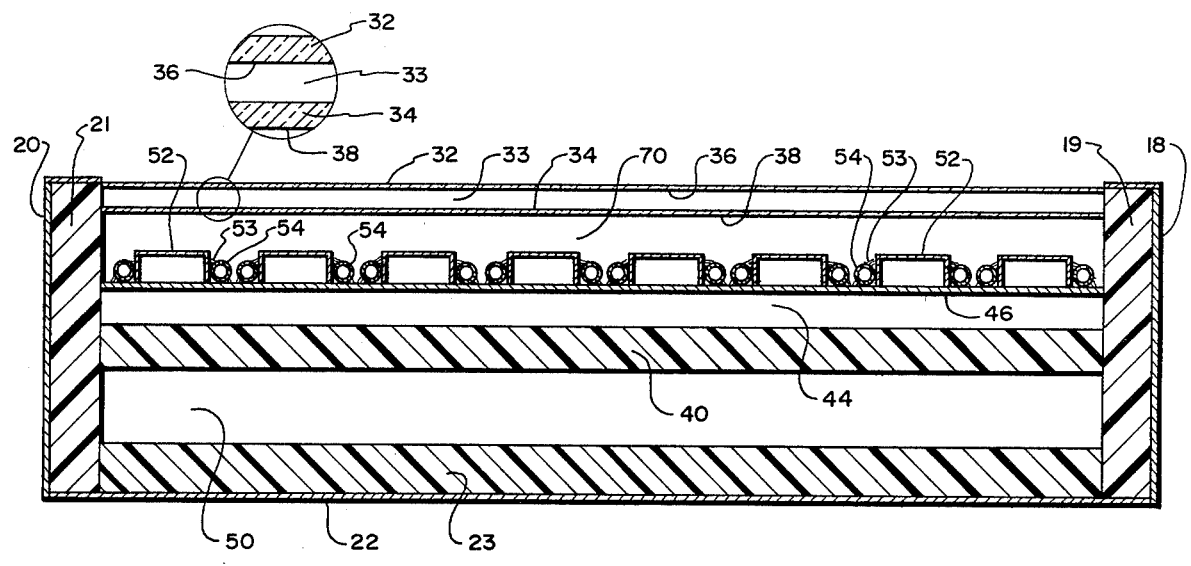
FIG. 3 is a cross section of the solar energy collector panel taken along lines 3—3 of FIG. 2.

Referring now more particularly to FIGS. 2 and 3, solar collector panel 10 is shown in detail. Only one solar collector, solar collector 10, is discussed herein since it is to be clearly understood that each of solar collectors 10–12 (FIG. 1) are constructed similarly. Solar collector 10 is fabricated as a box-like enclosure 16 having sides 18 and 20, top 24, bottom 28 and back 22. Each of the respective sides 18 and 20, top 24, bottom 28 and back 22 are faced with a suitable layer of insulative material. For example, sides 18 and 20 are faced with insulative layers 19 and 21, respectively, while top 24 is faced with an insulative layer 25 and back 22 is faced with an insulative layer 23.

Any suitable insulative material may be utilized in the present invention. However, for ease of manufacture and fabrication, it is currently preferred that the respective insulative layers be fabricated from a suitable organic foam material such as a polyurethane foam. Polyurethane foam is desirable because it is easily incorporated in a manufacturing process and has sufficient structural rigidity and inert characteristics in addition to possessing superior thermal insulative qualities so as to be admirably suited for use in solar collector 10.

Inexpensive manufacture of solar energy collector 10 is achieved by fabricating the external wall structure of the box-like configuration 16 according to conventional techniques. For example, with particular reference to top 24, top 24 may be manufactured from a suitable sheet of plywood upon which a layer of polyurethane foam has been sprayed to form insulative layer 25. Thereafter, top 24 may be assembled with similarly constructed sides 18 and 20, bottom 28 and back 22 to form the box-like enclosure 16 of this invention. Alternatively, the entire box-like structure of enclosure 16 may be fabricated initially from a sheet material such as plywood or sheet metal. Thereafter, the internal surfaces may be suitably coated with an appropriate insulative layer, for example, by spraying a layer of polyurethane foam thereon. Either technique readily accommodates the inexpensive manufacture of enclosure 16 of solar collector 10 of this invention. Where desired, the exposed face of each insulative layer may be selectively covered with a suitable reflective surface which will (1) seal the layer against possible moisture penetration and (2) serve as a means for reflecting infrared radiation thereby improving the insulative qualities of the respective insulative layer.

Enclosure 16 is enclosed by a pair of glass panes 32 and 34 which form the required transparent wall to enclosure 16. Glass panes 32 and 34 are separated by a dead air space 33 which forms an insulative layer against conductive and convective heat losses from the interior of enclosure 16. Additionally, the inside surfaces of glass panes 32 and 34 are coated with a suitable infrared reflective surface 36 and 38, respectively, to reflect infrared radiation back into enclosure 16.

The incident solar energy is received in enclosure 16 as electromagnetic radiation primarily in the visible spectrum. This solar energy is transformed to thermal or heat energy upon absorption. The absorbed heat energy raises the temperature of the absorbing surface resulting in a portion of the heat energy being reradiated as radiant heat energy at a lower wavelength or in the infrared wavelength ranges. Accordingly, glass panes 32 and 34 admit incident solar radiation into the interior of enclosure 16 while reducing convective, conductive and radiative heat losses therefrom. Glass panes 32 and 34 may be selectively fabricated from any material suitably transparent to the incident solar radiation and, therefore, need not be fabricated from glass, per se.

The interior of the enclosure 16 is segregated into heat chambers 70 and 44 and a return air chamber 50 by a divider 40 and a solar energy absorption plate 46. Divider 40 is fabricated as an insulative a foam wall panel and is also selectively coated with a suitable reflective coating (not shown) to reduce radiation heat losses.

Heat chambers 70 and 44 are formed as the air spaces on each side of solar energy absorption plate 46. Heat chambers 70 and 44 serve primarily as air passageways to convey an air flow into heat exchange relationship with the solar energy absorption plate 46. Additionally, the spatial separation of solar energy absorption plate 46 from the remainder of enclosure 16, divider 40 represented by heat chambers 70 and 44 reduces conductive and convective heat losses from solar energy absorption plate 46 to the surrounding structure of solar collector 10.

Solar energy absorption plate 46 is configured as a metallic plate painted with a solar energy absorbing black surface and has bonded thereto a plurality of air ducts 52 and water conduits 54. Air ducts 52 extend the surface area of solar energy absorption plate 46 and provide air passageways for intimate heat exchange between an air stream and solar energy absorption plate as will be discussed more fully hereinafter.

Water conduits 54 are attached to solar energy absorbtion plate 46 in conjunction with air ducts 52. In particular, each of water conduits 54 and air ducts 52 are soldered together at solder 53 and to solar energy absorbtion plate 46 so as to provide suitable thermal contact therewith. The various components of solar energy absorption plate 46 including water conduits 54 and air ducts 52 are also coated with a non-reflective black surface to provide improved absorption of incident solar energy.

An inlet manifold 60 distributes water, as indicated schematically as flow arrow 62, to the plurality of water conduits 54. Inlet manifold 60 resides in an inlet air plenum 71 and distributes the water 62 upwardly to the plurality of conduits 54. An outlet manifold 56 in heated air return 50 collects the heated water from conduits 54 as the same passes from thermal contact with solar energy absorber plate 46. The heated water is indicated schematically by flow arrow 58. The water directed through solar energy collector 10 may be obtained from a storage reservoir, a conventional water supply system or the like. The heated water may be stored in a storage reservoir or directed as preheated water to a water heater, etc., wherein the thermal energy absorbed thereby can be advantageously utilized.

Air, indicated schematically herein by inlet flow arrow 72 is directed into solar collector 10 through an inlet duct 76 and introduced into inlet air plenum 71. The air in air inlet plenum 71 is diverted as air flow arrows 64 through heat chambers 70 and 44 and air ducts 52 so as to pass in intimate heat exchange relationship with solar energy absorption plate 46. Heated air, indicated schematically as air flow arrows 47–49 departs each of heat chamber 44, air ducts 52 and heat chamber 70, respectively, where it is collected in the heated air outlet 50. Heated air outlet 50 is formed as the space between divider 40 and the rear wall 22 and terminates downwardly in an outlet plenum 73.

Inlet air 72 may be obtained from any suitable source including, for example, ambient air, room air, or air obtained from a rock pit (not shown) as set forth hereinbefore. For example, a duct 78 may be suitably provided with a deflector 77 which is operable by a lever 79 so as to allow air flow to be drawn through either of ducts 76 or 78. Lever 79 may be manually operable or suitably connected with the appropriate electro/mechanical apparatus so as to accommodate selectively obtaining the appropriate air from the desired source. Duct 78 may be in fluid communication with a rock pit or the like whereas duct 76 may be in fluid communication with the conventional ductwork of dwelling 14 (FIG. 1), ambient air, or the like.

Correspondingly, an outlet duct 80 is provided in fluid communication with outlet plenum 73. A conventional blower 84 is interconnected therewith for directing the outlet air flow, indicated schematically herein as air flow arrow 74. An alternate air flow path is provided by duct 82 and is suitably controllable by a deflector 81 operable by a lever 83, the function of which is similar to deflector 77 and lever 79, respectively. In this manner, the heated air may be directed to either of dwelling 14 (FIG. 1) or a rock pit (not shown) or the like for heat storage.

Additionally, the various water and air systems may be suitably interconnected either in series or in parallel with one or more water and air systems of other solar energy collector panels such as solar energy collector panels 11 and 12 (FIG. 1). Thus interconnected, the solar energy collector panels 10–12 of this invention provide a solar energy collector system wherein each solar energy collector panel 10–12 (FIG. 1) provides a modular unit to the total solar energy collector system.

Advantageously, the apparatus and method of this invention provides for (1) efficient absorption of incident solar radiation passing through panes 32 and 34, (2) reduction of convective, conductive, and radiative heat losses from solar collector panel 10, and (3) the efficient absorption of the solar energy through gaseous and liquid phases brought into intimate heat exchange relationship with solar energy absorption plate 46. Accordingly, the solar energy collector panels 10–12 of this invention are (1) inexpensive to fabricate, (2) readily adaptable to be used in conjunction with an existing structure, and (3) easily assembled into a larger solar collector system from the plurality of modular units.

Figure 4:
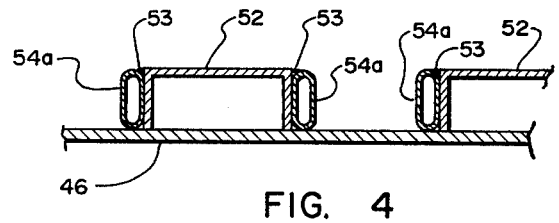
FIG. 4 is a partial cross section of a second preferred embodiment of the solar energy absorption plate of this invention.

Referring now more particularly to FIG. 4, a second preferred embodiment for solar energy absorption plate 46 is shown. In particular, a plurality of air ducts 52 are mounted to solar energy absorption plate 46 and a plurality of water conduits 54a are soldered thereto at solder 53. It should be particularly noted that the water conduits 54a are provided with a flattened profile so as to provide a larger surface contact and, therefore, thermal contact between water conduit 54a and air duct 52.

Figure 5:
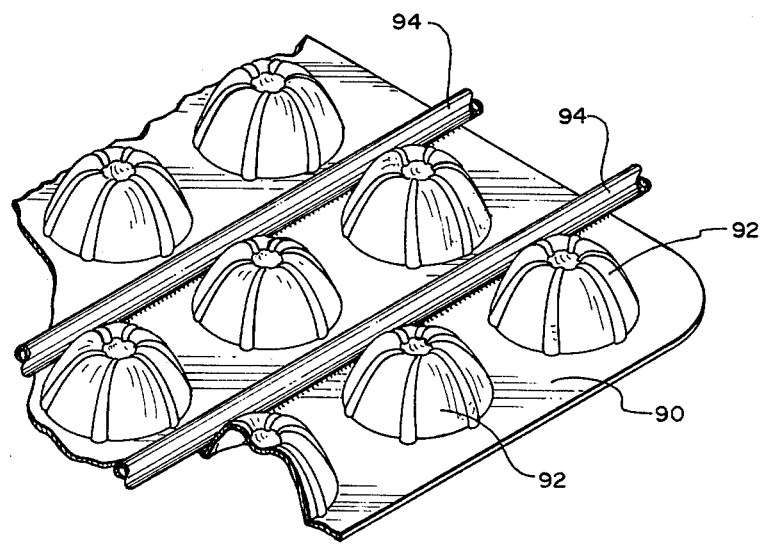
FIG. 5 is a partial perspective view of another preferred embodiment of the solar energy absorption plate of this invention.

Referring now more particularly to FIG. 5, a third preferred embodiment for a solar energy absorption plate is shown herein as solar energy absorption plate 90. Solar energy absorption plate 90 is configured with a plurality of raised surfaces 92 thereon which provide a significantly increased surface area. The increased surface area of solar energy absorption plate 90 provided by raised surfaces 92 is believed to (1) improve the absorption of solar energy and (2) provide a more efficient heat exchange with the air flow through solar energy collector panel 10. In particular, the raised surfaces 92 provide areas for increased turbulence and mixing of the air flow so as to improve the heat exchange therebetween.

A plurality of water conduits 94 are bonded to solar energy absorption plate 90 so as to be in intimate heat exchange relationship therewith. The solar energy absorption plate 90 may be readily substituted for the solar energy absorption plate 46 shown in FIG. 4 or the solar energy absorption plate 46 shown in FIGS. 2 and 3. It should also be noted that any of the illustrated solar energy absorption plates may be configured in either a horizontal or a vertical relationship with respect to solar energy collector panel 10. In either configuration, the appropriate inlet and outlet headers for the respective water conduits and the appropriate air plenum chambers will provide a suitable air and water supply and collect the heated water and air streams.

THE METHOD

In practicing the method of this invention, one or more solar energy collector panels 10–12 are inexpensively fabricated as set forth hereinbefore from an enclosure 16, transparent panes 32 and 34, divider 40 and heat absorption plate 46 (FIGS. 1–4) or 90 (FIG. 5). Thereafter, an appropriate number of solar energy collector panels 10–12 may be suitably mounted so as to receive maximum exposure to incident solar radiation. The mounting may be accomplished by placing the solar collector panels on roof 13 (FIG. 1) or similar raised structure, hillock 15 (FIG. 1) or the like.

Solar energy collector panels 10–12 may be suitably interconnected with their water and air streams either in series or in parallel, as desired, so as to accommodate each of solar energy collector panels 10–12 functioning as a modular unit in a solar energy collector system. Thereafter, the appropriate air and water systems may be suitably interconnected with the air ductwork (not shown) of dwelling 14, a storage system as set hereinbefore or the like. In this manner, the solar energy converted to thermal energy by solar energy collector panels 10–12 may be suitably conveyed to the proper appropriate utilization site in dwelling 14, a storage system (not shown) and/or the like. It is currently believed that the present solar energy collector system of this invention can be advantageously utilized to supplement and, possibly, replace the existing heating systems for a conventional dwelling 14. However, for reasons of complete dependability, it is currently suggested that the solar energy collector system herein be coupled with the conventional heating system in dwelling 14 and thereby serve as a supplemental heating source in the event of prolonged absence of sufficient sunshine.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a U.S. Letters Patent is:

1. A solar panel comprising:
   a framework comprising a back and a plurality of sidewalls defining an open-face, box-like structure;
   a transparent closure mounted to the open face of said framework;
   divider means inside said structure spaced between and generally parallel to said back and said transparent closure, said divider means forming an air return with the back;
   a solar energy absorption plate mounted adjacent said divider means in said framework and enclosed by said transparent closure;
   a plurality of air ducts mounted on said solar energy absorption plate so as to be in heat exchange relationship therewith;
   said air ducts each having an open end in communication with said air return; and
   a plurality of conduits for transporting liquid through said solar panel, each said conduit being joined in heat exchange relationship to said solar energy absorption plate and to one of said air ducts.

2. The solar panel defined in claim 1 wherein said framework is fabricated from a plurality of insulated wall elements which form an enclosure in combination with said transparent closure.

3. The solar panel defined in claim 1 wherein said air ducts comprise raised segments formed on said absorption plate and configured as a plurality of flow channels for receiving at least a portion of the air flow in heat exchange relationship with the solar energy absorption plate.

4. The solar panel defined in claim 3 wherein each said conduit is joined in heat exchange relationship with a portion of one of the flow channels formed by said raised segments.

5. The solar panel defined in claim 1 wherein each said conduit is fabricated as a generally flattened conduit joined in heat exchange relationship to one of said air ducts.

6. A solar panel comprising:
   a framework comprising a back and a plurality of said walls to define an open-face, box-like structure;
   a transparent closure mounted to the open face of the framework;
   a divider mounted inside the framework in a position generally parallel to and spaced from the back;
   a solar energy absorption plate mounted in spaced relationship between the divider and the transparent closure;
   a plurality of air ducts mounted in heat exchange relationship with the solar energy absorption plate;
   a plurality of conduits mounted in heat exchange relationship with the solar energy absorption plate; and
   air return means for collecting air from the air ducts and directing the collected air through the space between the divider and the back.

7. The solar panel defined in claim 6 wherein the framework is fabricated with an organic foam material as an insulative layer.

8. The solar panel defined in claim 6 wherein the transparent closure is fabricated from two sheets of transparent material which are mounted to the framework, the sheets being mounted in spaced relationship.

9. The solar panel defined in claim 6 wherein the surface of the transparent closure toward the solar energy absorption plate is coated with an infrared reflective material.

10. The solar panel defined in claim 6 wherein the space between the solar energy absorption plate and the divider is configurated as an air flow path.

11. The solar panel defined in claim 6 wherein the solar energy absorption plate is coated with an absorptive coating to absorb incident solar radiation.

* * * * *